Aug. 2, 1960 J. E. HAWXHURST 2,947,358

ROLL SPACING FOR A CARD PUNCH MECHANISM

Filed May 27, 1959 3 Sheets-Sheet 1

INVENTOR
JOHN E. HAWXHURST

BY Maurice H. Klitzman
ATTORNEY

Aug. 2, 1960 J. E. HAWXHURST 2,947,358

ROLL SPACING FOR A CARD PUNCH MECHANISM

Filed May 27, 1959

3 Sheets-Sheet 2

Aug. 2, 1960 J. E. HAWXHURST 2,947,358

ROLL SPACING FOR A CARD PUNCH MECHANISM

Filed May 27, 1959 3 Sheets-Sheet 3

2,947,358
Patented Aug. 2, 1960

2,947,358

ROLL SPACING FOR A CARD PUNCH MECHANISM

John E. Hawxhurst, Endwell, N.Y., assignor to International Business Machines Corporation, New York, N.Y., a corporation of New York Filed May 27, 1959, Ser. No. 816,279
5 Claims. (Cl. 164—115)

This invention relates to a record card punch, and in particular, to means for spacing the feed rolls of a high speed punch so as to be capable of handling cards of different thicknesses.

In general a punch is used either as a duplicator or reproducer in summary or gang punching. Generally the cards are removed from a hopper by feed knives or the like and fed into feed rolls. These feed rolls then feed the card under reading brushes, which read openings in the cards into a computer. The computer may compute the information and feed it back into the punch to be punched into the card from which the information was taken. The cards are then passed through the punching station and into second reading brushes which can be used either to read the information back into the following cards or can be used to verify the punching already accomplished. Additional feed rolls then transport the card into a stacker for storing purposes.

When the card passes through the punch station and into a read station, a pulse is obtained by a brush dropping through a hole in the card onto a contact roll to complete a circuit. The pulse is then used for controlling the action of the punch. Now the speed of the machine and the size of the hole determines the length of time for the brush to read and establish a pulse to actuate the punch.

When a pulse is received a magnet is energized which actuates an armature for moving an interposer under an oscillating punch bail. Normally the punch bail does not actuate the punch even though it is oscillating. When a pulse is received and the interposer is actuated the interposer is positioned between the punch bail and punch to move the punch a distance sufficient to pass through the card.

If the pulse is received from the read brushes so as to be recognized and used by another mechanism at the appropriate time, the brushes must be accurately located to read a hole at the proper time. The punch which receives the impulse must be so timed with the reading that they operate in synchronism with each other so that the punch can properly recognize the pulse. In order to punch the proper information as read, the index point of the card at the punching station must correspond to the same index point on the card at the read station. For example, if a 7 hole is read on the card, the 7 hole must be punched when the 7 column reaches the punching station.

Generally the card is moved intermittently through the punch station and punched while the card is standing still. Since a standard card has 12 punching positions, it has been convenient to use a card that is 3¼" from top to bottom, the distance between centers of adjacent punching positions being ¼". This is commonly referred to as the cycle point which amounts to ¼" movement of the card. Therefore, when a card is being read at an index position, such as the 8 position, the next immediately succeeding card is at the punch station with the card having its index position 8 under the punch. In other words, cards can be reproduced by the information being transmitted by sensing openings in one card and piercing similar openings into an immediately following card, each card serving as a master card for the following card.

In order to maintain the proper timing relationships, the cards have been moved intermittently through the punch station and the read station, with substantially the same intermittent movement cycle. On occasion it has been the practice to read one card a cycle point ahead of the card being punched at the punch station while maintaining the same intermittent movement cycle in order to accommodate the time delays and set up the interposer for the next punch. In order to increase the speed of punching, the use of a single Geneva for driving the card intermittently both through the punch station and read station has been changed. This change consisted of Geneva wheels for driving the card intermittently through the punch station, but continuously rotating feed rolls for feeding the card continuously through the read station. This arrangement minimized the acceleration forces which accompany intermittent motion during acceleration and deceleration. Furthermore, it provided a lower speed at which the cards could be read even though more cards per minute were being fed through the punching apparatus.

Now in order to increase the speed of the machine, the card is at the read station at one index point while the punch is still punching a later index point in the succeeding card. This means that the read station must be within one card cycle distance from the punch station. Therefore, the intermittent feed rolls and the continuously rotating feed rolls are coextensive with the card, and if allowed to, could engage the card simultaneously. However, the intermittent feed rolls have some means for accommodating continuous motion, while the continuously rotating rolls have some means for accommodating intermittent motion. In order to do this, the intermittent motion feed roll is provided with a roll opening device for opening and closing the rolls on the card at predetermined intervals. For example, the rolls are opened when the continuously rotating feed rolls are feeding the card continuously, and the intermittent feed rolls then close and feed the card intermittently partially through the continuous feed rolls when a relieved portion on the continuous feed rolls is exposed to the card.

Since the cards are being fed through the punch station and read station at a relatively high speed (for example, 250 c.p.m., with an index point speed of approximately 9 milliseconds), the opening and closing of the rolls must be timed very accurately so as to move the card precisely through the punch station according to its timed relationship with reading so that the card is properly positioned at the punch station at the proper index point when the brushes read and set up the punch for the punching operation.

Now cards are not of the same thickness. For example, post cards vary considerably in thickness from the commonly used record business card. Also, some cards are folded over on themselves and fed through a machine. In a high speed punch of the type described above, the roll opening and closing device and the relieved continuous feed rolls must close on the card with very accurate timing in order to move the card with precision. Therefore, the roll opening device and relieved continuous feed rolls will lose their precision timing when a different thickness card is passed through the machine. For example, if a different thickness card is used, say a greater thickness, the intermittent feed rolls will engage the card prematurely when it is actuated to grip the card. The timing for the intermittent motion to take place will occur too early and move the card out of phase with the read timing and the rest of the timing operations of the machine. The raised portion on the continuous rolls will likewise engage the card too early. Of course an obvious solution to this problem would be to design a machine for each of the thicknesses of cards being used. However, it is recognized that such a solution is impractical in addition to being very expensive.

Another problem associated with high speed punching devices is that of card jams. Cards jam in the punch area due to warping and the like. This warping is an inherent one and is caused either by reuse of the card many times, or by a slight malfunction of the apparatus. When a card jams with the feed rolls still in engagement with the card, the friction or pressure exerted by the rolls on the card makes it difficult for the card to be removed.

It is therefore an object of this invention to provide a high speed punch with means for accommodating various thickness cards without adversely affecting the timing of the punching operation with respect to the reading, and the intermittent and continuous operating feed rolls.

It is another object of this invention to provide a punch with means for more readily removing cards due to card jams.

Briefly stated and in accordance with one aspect of this invention, I provide a means for maintaining the distance that at least one roll of each pair of intermittent motion feed rolls and each pair of continuous rolls must travel to engage a card that is to be intermittently fed through the punch station or continuously through the read station so that the card is engaged at precisely the same index point regardless of the thickness of the card. Also the same means is used to separate the rolls when a card jam occurs so as to provide easy removal of the jammed cards from the area of the punch station.

Other objects of the invention will be pointed out in the following description and claims and illustrated in the accompanying drawings, which disclose, by way of examples, the principle of the invention, and the best mode, which has been contemplated, of applying that principle.

Figure 1:
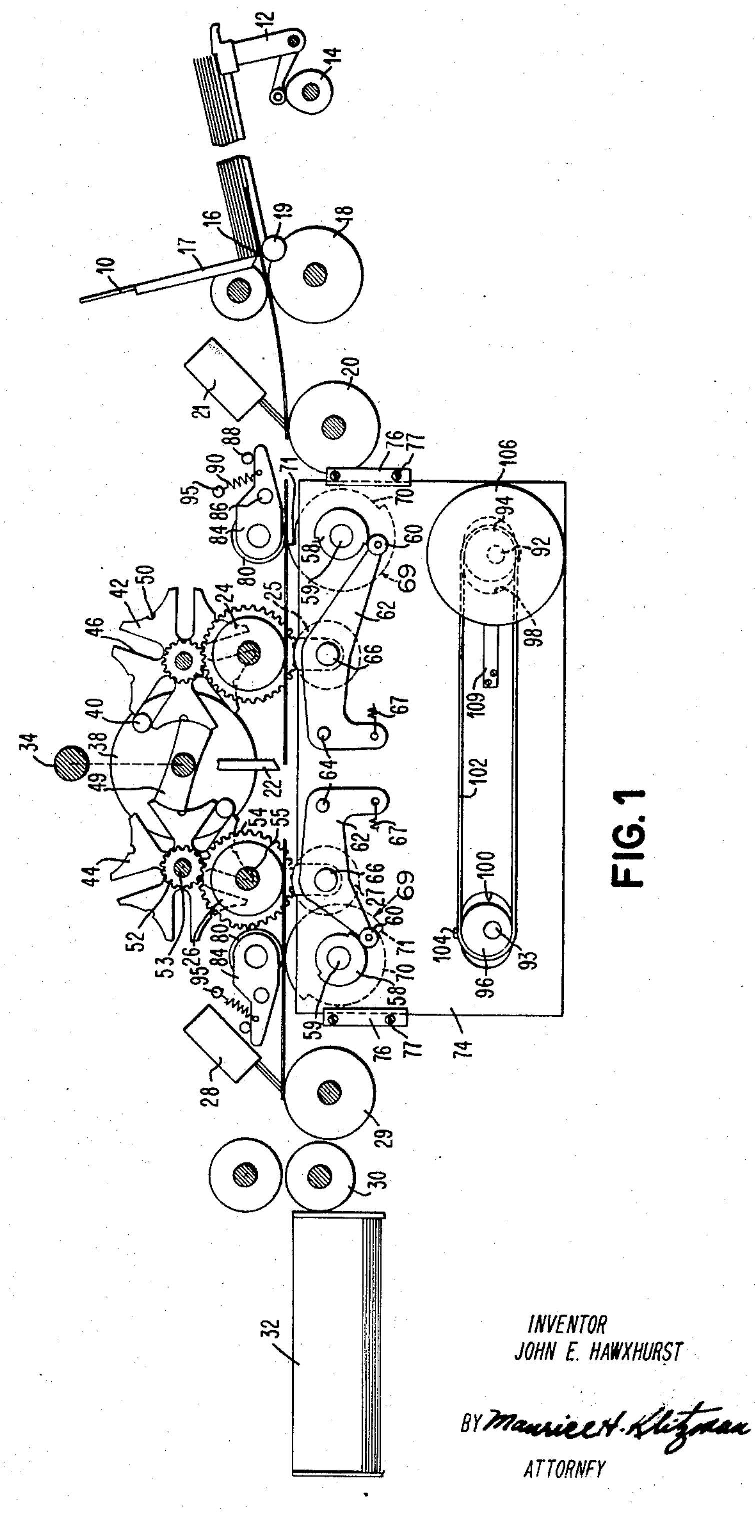
Fig. 1 is a schematic view of a high speed punch mechanism.

Fig. 1 shows the invention applied to a high speed read punch and includes a hopper 10 which contains cards adapted to be removed by picker knives 12. The picker knife is oscillated by a camming mechanism 14. The cards are fed through the throat 16 defined by throat knife 17 and roll 19. The cards then pass into first feed rolls 18, which feed the card under continuous motion through the first read station. This read station is used if information is to be read from the card and transmitted to a computer. The results are used to control the punch so as to punch the computed information into that card when that card arrives at the punch station. If such a function is performed, or a like function, then read brushes 21 are provided to co-operate with contact rolls 20 to read the cards as they pass through. The cards are then fed into the punch station 22 so that the information read from the card at the read station and fed into the calculator can control the operation of the punch station 22 for punching the information back into that card.

In order to feed the cards through the punch station 22 so that the punch can punch openings into the card while the card is standing still, intermittently driven feed rolls 24 and 26 are provided. Opposing each of the intermittently driven feed rolls are friction rolls 25 and 27. It is not required that these friction rolls be driven since the roll pressure is sufficient to drive these rolls 25 and 27 according to the motion of the intermittent feed rolls.

If this read punch device is used to transmit information from an immediately preceding card into an immediately succeeding card, for example, from a master card into an immediately following detail card, and from that detail card into the next following detail card, etc., read brushes 28 and contact roll 29 are provided for this purpose. The brushes read the openings in the card as it passes underneath the brushes and transmits this information to the punch device so as to punch the information into the immediately following card as it passes through the punch station. The card then passes into feed rolls 30 into a stacker 32. The stacker is shown in schematic form since it forms no part of this invention, there being many types of suitable stackers that can be used with this invention.

In order to synchronize the mechanical motions of the picker knife card feed, the continuous motion of the card at the read station, the intermittent motion of the card through the punch station and punching device, a common main drive shaft 34 is provided from which all of the other components are geared so as to be actuated in timed sequence in accordance with the appropriate timing. The various drive shafts and feed rolls are interconnected by appropriate gears and sprocket-like pulley belts in order to maintain the proper timing sequence of the rolls.

In order to drive the rolls 24 and 26 intermittently so that the card is moved intermittently through the punch station to enable the punch to perforate the card while the card is motionless, I provide a drive wheel 38 provided with pins 40. The pins 40 in turn drive Geneva wheels 42 and 44 according to an intermittent motion. The Geneva wheels are turned intermittently by the pins engaging slots 46. This type of a mechanism results in the wheels accelerating from zero velocity to a maximum velocity as the pin nears the base of the slot and then drops to zero velocity from the maximum velocity as the pin leaves the slot. During the time that one of the pins 40 leaves the slot to move around and engage the other Geneva wheel, the feed rolls are motionless so that the card is then in position to be punched.

In order to prevent the Geneva wheels from rotating while the pins 40 are out of the slot 46, a rotating guide member 49 fixed to the wheel 38 is provided. However, as the rotating guide member leaves the intermediate portion, there is a tendency for the trailing edge to engage the base of the intermediate portion. Therefore, to eliminate binding and the like and excessive wear as a result thereof, a notch 50 is provided in the base of the intermediate portion. As a result of this Geneva mechanism, the rolls 24 and 26 are driven intermittently through gears 52 mounted on Geneva shaft 53 and gears 54 mounted on the intermittent motion shaft 55.

In the punch shown, the sensing brushes 28 are positioned sufficiently close to the punch station in order to sense the holes in a card while the punch is punching a later hole at a later index point on another card at the punch station. In order to increase the speed of reading and punching and to minimize the mass driven by the intermittent feeding by the Genevas, the card is moved intermittently through the punch station and continuously through the read station. Since the card is read sufficiently early to set up the punch assembly, the read brushes at 28 and the contact roller 29 must be positioned within a card cycle of the punch station. The continuous rolls and the intermittent rolls are, therefore, coextensive with a card. Therefore, the continuously rotating rolls cooperate with the intermitten feed rolls to accommodate intermittent motion and the intermittent feed rolls co-operate with the continuously rotating feed rolls to accommodate continuous motion. In order for the intermittent feed rolls to accommodate continuous motion during passage of the cards through the rolls, a roll opening device is provided. Although it is preferred to use a roll opening device for accommodating continuous motion in the intermittent feed rolls, it is recognized that the same could be accomplished by providing a recessed portion in the periphery of one of the feed rolls exposed to the card when it is desired to have continuous motion.

The roll opening device includes a cam 58 mounted on the continuously rotating shaft 59. The cam is so designed as to initiate the opening of the intermittent feed rolls at the proper time. A follower 60 operates on the cam and is mounted on a roll opening link 62. The roll opening link is pivotally mounted on a fixed pivot 64 and rotatably supports a shaft 66. A spring 67 biases the follower into engagement with the cam. Therefore, when the follower hits the high portion of the cam, the link pivots clockwise (as viewed in Fig. 1) about the pivot 64 to open the rolls to accommodate continuous motion through the intermittent feed rolls.

Since the read brushes 28 and the contact roll 29 are located within one card cycle from the punch station, the continuously rotating feed rolls 69 are also within one card cycle from the punch station, and to such an extent that it must be capable of accommodating intermittent motion while the card is passing through the continuous feed rolls. This is accomplished by providing a relief 70 in the periphery on one of the feed rolls. Therefore, it is only necessary to provide the lower feed rolls with a relief or recess, since the upper feed rolls, which co-operate with the continuously rotating feed rolls to move the card, contain a continuous periphery and are rotated when they are engaged by the uninterrupted portion of the lower feed rolls.

The roll opening cam 58 mounted on the shaft 59 of the continuous feed rolls 69 is designed to provide the roll opening of the intermittent feed roll with microsecond timing. In the event that a larger thickness card is used, the intermittent feed rolls close on the card to pass it intermittently through the punch station. However, the larger thickness card will normally cause the feed rolls to engage the card prematurely and prematurely start moving the card intermittently through the punch station. When this happens, the punch will not be punching the information that is being read at the proper location on the card at the punch station. For example, if a post card is used instead of a regular record keeping card, the increase of thickness will cause the card to be moved at least one index point from the correct index position at the punch station. Also the timing of when the roll opening device is initiated will be off since it is responsive to a cam position on the continuously rotating rolls. Even though the feed rolls may be open to pass the post card, the cam 58 will not actuate the follower to open and close the intermittent rolls at the proper time for the increased thickness card. Also the edge 71 adjacent the relief 70 will engage the card prematurely. Therefore, in order to maintain the proper timing so that the correct index point is at the punch station, means for raising and lowering the rolls are provided to adjust the position of the continuous and intermittent rotating feed rolls to maintain the distance that the intermittent and continuous feed rolls must travel before they engage the card.

Figure 2:
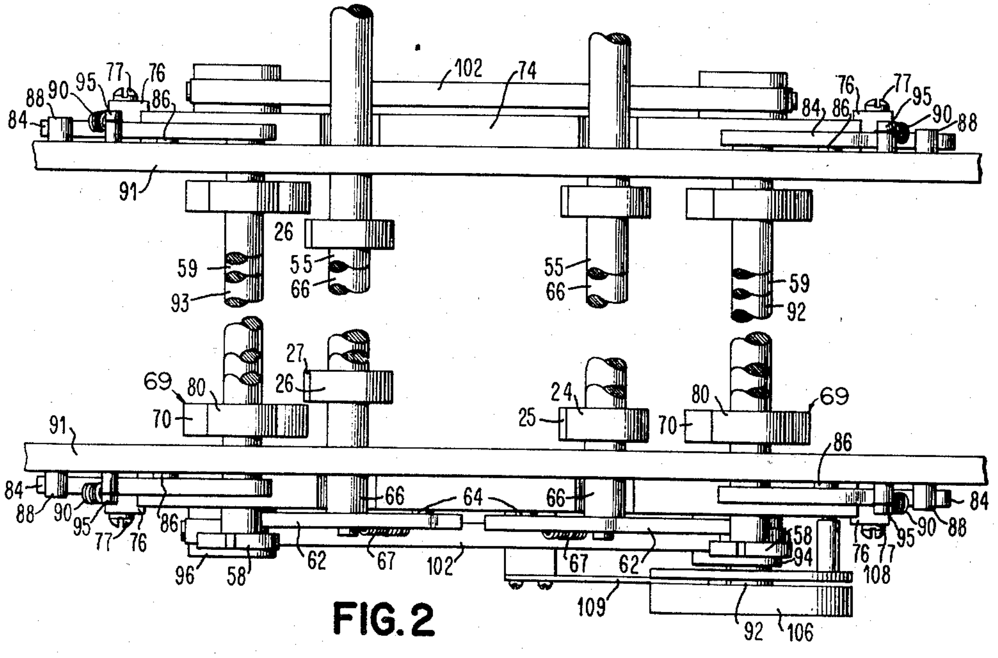
Fig. 2 is a plan view of the punch.

In order to raise and lower the feed rolls, plate 74 (see also Fig. 2) supports the shafts 66 and 59 for the intermittently driven feed rolls and the continuously driven feed rolls. It is important to note at this point that only the lower feed rolls need be moved. In order to raise and lower the plate 74 along with the shafts for the intermittent and continuous feed rolls, guides 76 are provided which are fixed to the side frames 91 of the punch assembly by screws or the like 77.

In order to prevent the upper continuous feed rolls 80 from dropping down below the card feed line, lever arms 84 (Fig. 3) are provided to support the shafts of those feed rolls. This lever arm is pivotally mounted to the side frame 91 by a pintle 86. The lever arm 84 is limited in its movement by a stop pin 88 in the side frame. Further, in order to bias the feed rolls downwardly at all times so as to exert pressure on the card as it passes intermittently through the punch station, a spring 90 is provided which is also connected to the side frame at 95 and to the lever arm as shown.

In order to raise and lower the plate 74 (Fig. 3) with respect to the side frames 91, shafts 92 and 93 are provided and are mounted in the side frames and extend through the adjustable support plates 74. Mounted on the ends of each of the shafts 92 and 93 are a pair of eccentrics 94, 96, there being one pair for each plate. These eccentrics are positioned in elongated openings 98, 100 in each plate so that as the eccentrics are rotated, the plate is raised and lowered. Since the eccentrics are positioned to operate in the elongated slots 98, 100, it is apparent that the plate will raise and lower with the turning of the eccentric in the slot. In order to turn the eccentrics in synchronism, a steel tape 102 fixed to both eccentrics by rivets or screws or the like 104 is provided. A knob 106 is mounted on the outside of the side frame for the operator to turn the shaft 92. When the shaft 92 is turned, the eccentrics will rotate and the plate will be raised and lowered by sliding in the guides 76 mounted on the side frames 78.

Figure 5:
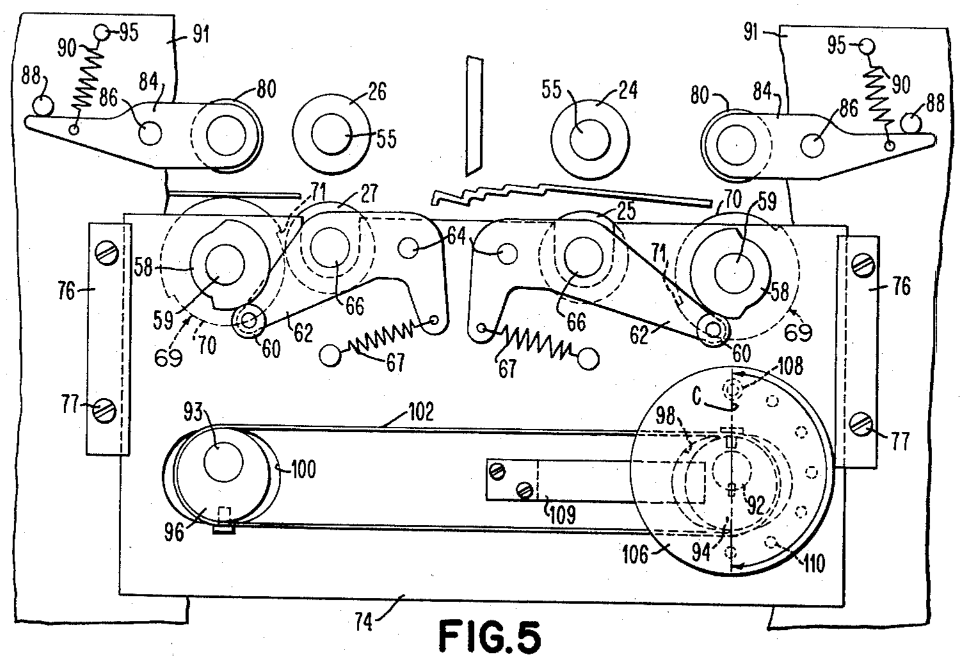
Figs. 3–5 are schematic views showing a normal thickness card, an increased thickness card and a card jam at the punch station.
Figure 3:
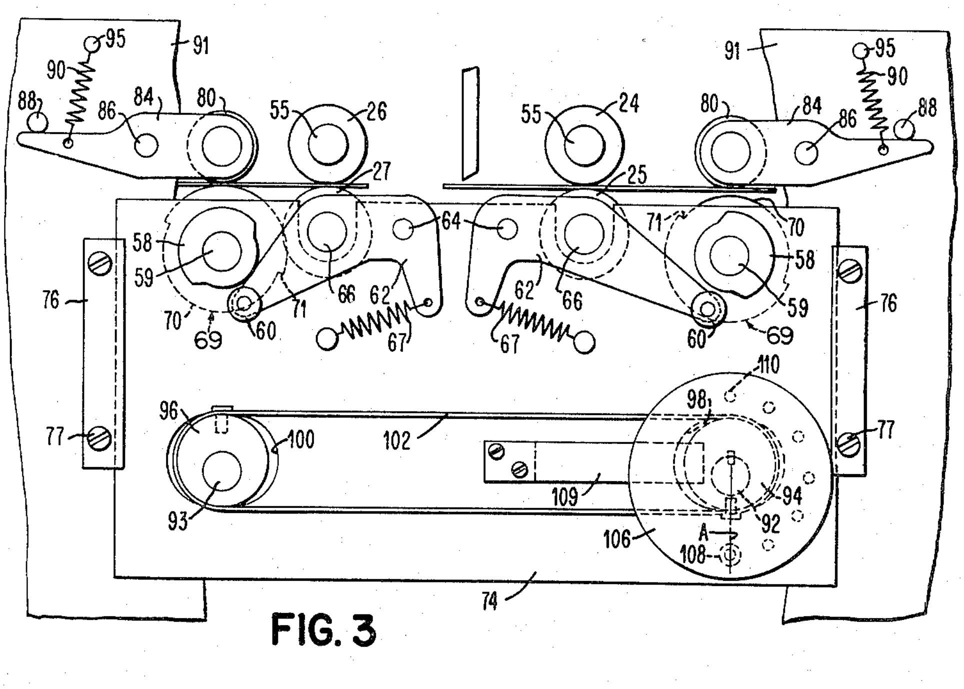
Figure 4:
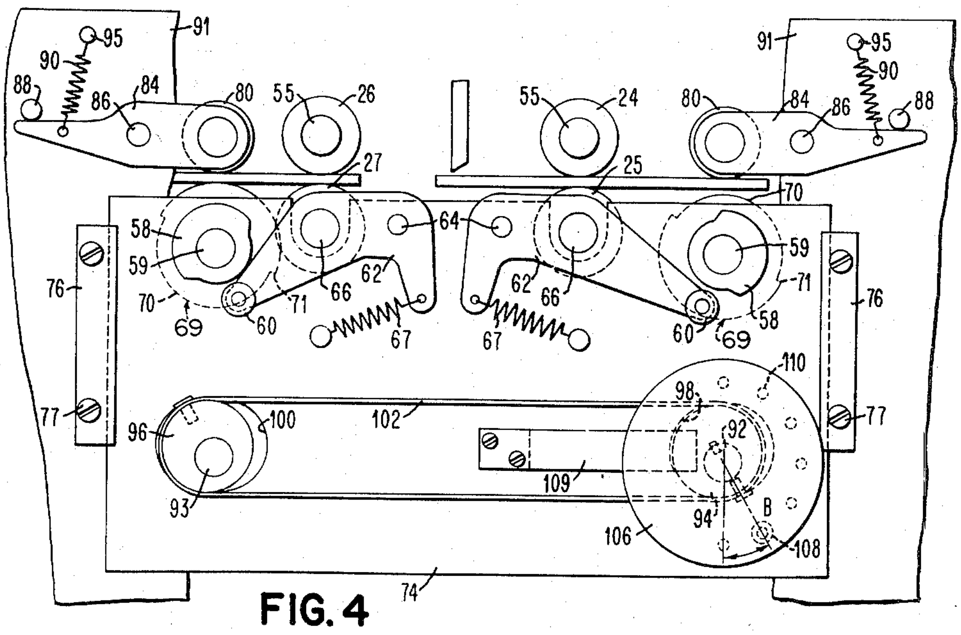

Reference is made to Figs. 3–5 which show different thickness cards and a card jam occurring in the punch. These conditions require different positions for the feed rolls. For example, in Fig. 3, under normal conditions while feeding a standard card, the knob is shown positioned at A. This can be accomplished by a pin 108 for insertion into an opening 110 in the plate 74 to thereby lock the support plate 74 in position. When a card of an increased card thickness is to be fed through the machine, the pin is released by retracting the knob and the knob turned to the position B (Fig. 4) where the pin 108 is again inserted and an opening 110 provided in the support plate to thereby lock it in this position. The pin 108 is biased into position by leaf spring 109. Of course it is within the scope of this invention to provide various openings 110 in the side frame so as to position the knob, and in turn, the support plate at various desirable incremental positions.

In the event of a card jam (Fig. 5), the knob is turned to position C to permit the operator to then reach up into the mechanism and grasp the card and remove it without difficulty since none of the feed rolls will be engaging the card.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a high speed card punch comprising a punch mechanism, sensing means for reading the cards and sending an impulse to the punch mechanism to actuate the punch to punch the card, feed rolls, an adjustable support frame for supporting the feed rolls, roll spacing means on the adjustable support for opening the rolls and maintaining the same distance that the rolls must travel to engage the card regardless of the thickness of the card to maintain the same timing relationship of card movement with respect to the punch and sensing means.

2. In a high speed card punch comprising a punch mechanism, sensing means for reading the cards and for sending an impulse to the punch mechanism to actuate the punch to punch the card, intermittent feed rolls for feeding the card intermittently by the punch, continuously rotating feed rolls for feeding the card continuously by the sensing means, roll spacing means for the intermittent rolls, relief means for the continuous rolls, an adjustable support for supporting the feed rolls to maintain the distance the roll spacing means and relief means must travel for the feed rolls to engage the card.

3. In a high speed card punch, a punch mechanism, read means for reading cards and sending an impulse to the punch mechanism to punch the cards, the read means being less than one card cycle from the punch station, intermittent feed rolls for feeding the card through the punch station, continuous feed rolls positioned between the intermittent feed rolls and the read means, roll opening means for opening the intermittent feed rolls while the card is being fed continuously through the continuous feed rolls, relief means to permit feeding the card intermittenly through the continuous feed rolls, support frames for supporting the intermittent feed rolls, the continuously rotating feed rolls and the roll opening means, and the support frames being adjustable for spacing the feed rolls independently of the roll opening means to maintain the same timing relationship of card movement with respect to the punch mechanism regardless of the thickness of the card passing through the punch.

4. A high speed card punch comprising a punch station, a read station, continuously rotating feed rolls and intermittent feed rolls for transporting the card through the punch station and out of the punch station, adjustable support frames, the lower feed rolls of each pair of the intermittent and continuous feed rolls being supported in the adjustable support frames, the upper feed rolls of the intermittent and continuous motion feed rolls being mounted in a fixed side frame, camming means positioned on the adjustable support frames to raise and lower the support frame to enable the feed rolls to maintain the proper timing relationship regardless of the thickness of stock used, and to space the feed rolls during a card jam to enable the card to be removed.

5. In a high speed feed mechanism for feeding business record cards, intermittent feed rolls for feeding the cards intermittently, continuously rotating feed rolls capable of feeding cards continuously, the intermittent feed rolls and continuous feed rolls being spaced from each other but coextensive with respect to the same card, means on the intermittent feed rolls for accommodating continuous motion, means on the continuously rotating feed rolls for accommodating intermittent motion, and adjustable support means for spacing each pair of intermittent feed rolls from each other and each pair of continuous rolls from each other to provide precision card feeding regardless of the card thickness.

References Cited in the file of this patent

UNITED STATES PATENTS

| | | |
|---|---|---|
| 998,736 | Armstrong | July 25, 1911 |
| 1,718,146 | Hartman | June 18, 1929 |
| 2,531,873 | Daly | Nov. 28, 1950 |